May 3, 1966 A. A. BERG 3,249,123
FLIP-TYPE CHARGING AND EXHAUST VALVE
Filed April 29, 1964
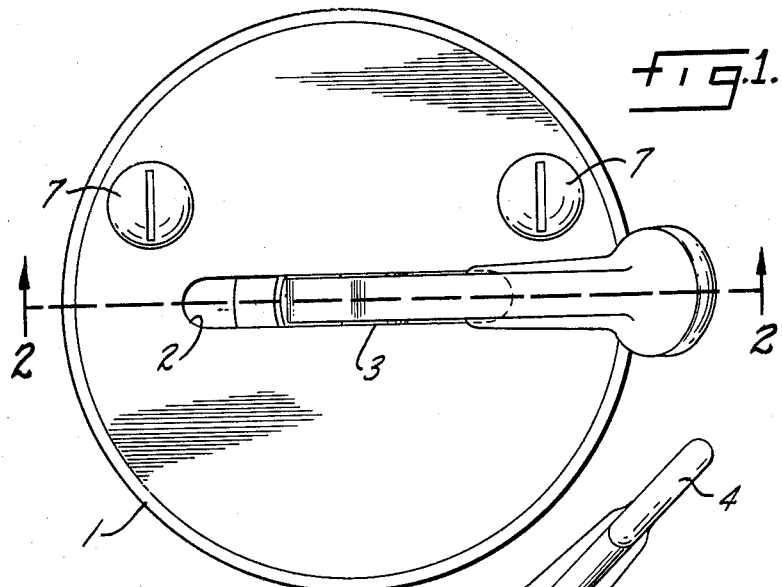
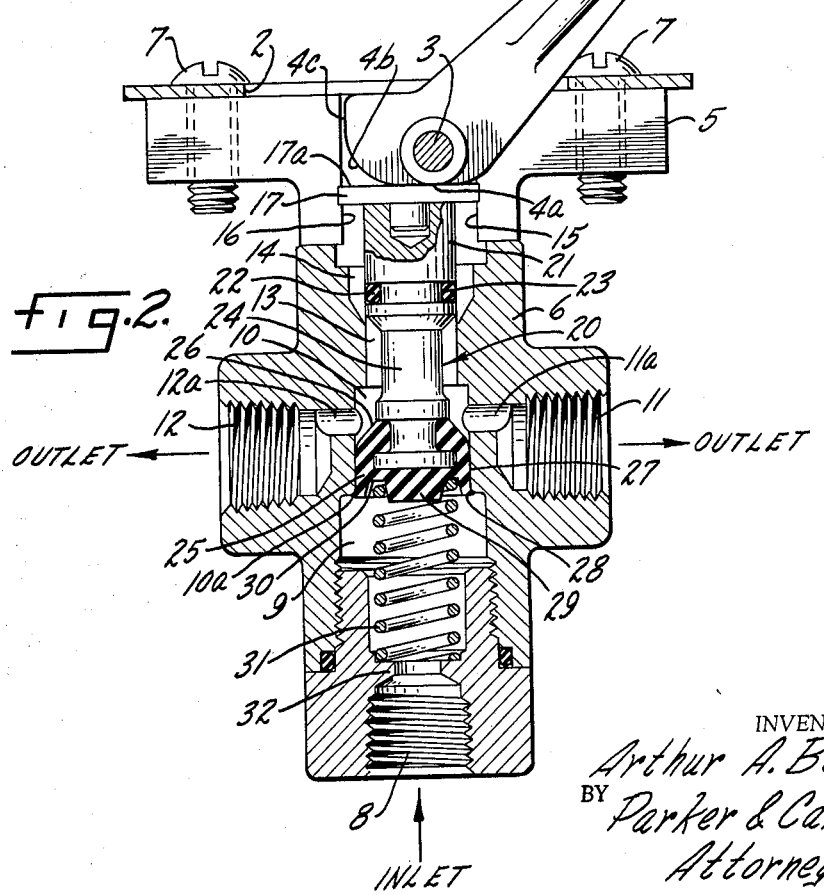
INVENTOR.
Arthur A. Berg,
BY Parker & Carter
Attorneys.

United States Patent Office 3,249,123
Patented May 3, 1966

3,249,123
FLIP-TYPE CHARGING AND EXHAUST VALVE
Arthur A. Berg, Lincolnwood, Ill., assignor, by mesne assignments, to Berg Mfg. & Sales Co., Des Plaines, Ill., a corporation of Illinois
Filed Apr. 29, 1964, Ser. No. 363,529
1 Claim. (Cl. 137—625.26)

This invention relates to valves and has particular relation to a flip-type valve usable particularly in the air pressure brake systems of vehicles such as the tractor-trailer type. Such vehicles normally require means for charging such systems and for exhausting such systems rapidly and positively under emergency conditions in order to apply the brakes. Accordingly, it is one purpose of the invention to provide a valve and valve-operating assembly effective to provide the vehicle operator with positive direction of fluid pressure and with easily operable means for exhausting the system rapidly in an emergency.

Another purpose is to provide a positive-acting valve.

Another purpose is to provide a flip-type valve and operating mechanism assembly.

Another purpose is to provide a valve having an inlet, a pressure outlet and an exhaust outlet.

Another purpose is to provide a valve having an exhaust outlet sealable in response to movement of the valve toward pressure-transmitting position.

Another purpose is to provide a valve having an inlet, a pressure outlet and an exhaust outlet and a unitary valve member movable between a position communicating said inlet with said pressure outlet and another position communicating said outlet with said exhaust outlet.

Another purpose is to provide a valve assembly having a valve member movable in a chamber and employing a portion of said chamber as an exhaust passage.

Another purpose is to provide a valve assembly including a unitary valve member movable in response to operation of an eccentrically-mounted handle element.

Another purpose is to provide a valve assembly of maximum compactness and economy in manufacture.

Another purpose is to provide a cartridge-type valve member.

Another purpose is to provide a positive-acting two-position valve employing a single yielding member.

Another purpose is to provide a valve assembly in which a portion of a valve chamber therein functions additionally as an exhaust passage and outlet.

Other purposes will appear from time to time during the course of the specification and claim.

The invention is illustrated more or less diagrammatically in the accompanying drawings, wherein:

FIGURE 1 is a top plan view; and
FIGURE 2 is a side elevation with parts in cross section.

Like parts are indicated by like numerals throughout the specification and drawings.

Referring now to the drawings, and particularly to FIGURE 1, it will be observed that a cover plate 1 is slotted as indicated at 2. Extending through the slot 2 and eccentrically mounted for rotation on shaft 3 is a manually operable handle element 4. The handle 4 has a relatively flat surface 4a for engagement with a valve member when handle 4 is in exhaust or emergency position as shown, a curved intermediate camming surface 4b and a second relatively flat surface 4c for engagement with a valve member when handle 4 is in fluid pressure transmitting position. The shaft 3 is carried by an upper frame portion 5 of a valve housing 6. The cover 1 may be secured to the housing frame portion 5 in any suitable manner, for example by the fasteners 7.

The housing 6 has a fluid pressure inlet 8 formed therein for communication with an internal pressure chamber 9. The chamber 9 has a reduced cylindrical portion 10 at the end thereof opposite the inlet 8. Fluid pressure outlets 11, 12 are formed in the housing 6 and communicate, through reduced passages 11a, 12a, respectively, with the chamber portion 10 in housing 6. A continuing chamber portion 13 is formed in housing 6 in axial alignment with inlet 8, chamber 9 and chamber portion 10, the portion 13 communicating with chamber 10 and extending therefrom beyond the outlet passages 11a, 12a. Axially paralleling chamber portion 13 and communicating therewith, at the end thereof opposite the end of chamber portion 13 which communicates with chamber portion 10, is a plurality of fluted passages 14.

It will be observed that frame structure 5 includes at least two parallel, spaced, opposed guide surfaces or portions 15, 16. The surfaces or portions 15, 16 extend in parallel relationship with the axis of chamber portions 13, 10, 9 and inlet 8. An abutment plate 17 slidably engages the guide surfaces 15, 16 for reciprocal movement therealong, the upper surface 17a of plate 17 being maintained in contact with surfaces 4a, 4b, 4c of handle 4.

Secured to plate 17 is a valve member 20. The member 20 has a first cylindrical portion 21 immediately adjacent plate 17 and having an outer diameter substantially equal to the diameter of chamber portion 13 for slidable movement therein. A seal member, such as the O-ring 22, is carried in a groove 23 formed in the portion 21, the seal member 22 engaging the inner surface of chamber 13 in sealing engagement therewith when the valve member 20 is moved toward inlet 8 by handle 4. As may be clearly seen in FIGURE 2, the seal 20 engages the lands between flutes or slots 14 when the valve is in the position illustrated in FIGURE 2, the flutes 14 permitting bypassing of seals 22 and communication of chamber 13 with the atmosphere adjacent housing frame segment 5.

Adjacent the cylindrical portion 21, the valve member 20 has a reduced cylindrical portion 24 positioned for reciprocation within chamber portions 13, 10. Beyond the portion 24 from the portion 21 the valve member 20 carries a valve element 25. The valve member 25 is formed of relatively flexible material having rubberlike qualities and includes a flared or outwardly conical upper surface 26 and a major cylindrical outer surface 27, the diameter of which is such as to cause engagement between the valve surface 27 and the inner surface of chamber portion 10. The cylindrical surface 27 terminates in a thin, flexible, annular lip segment 28. An axially extending abutment portion 29 is formed in the valve member 25 within the skirt 28 and inwardly spaced therefrom to define an annular groove 30 in the outer end face of member 25. A spring 31 is positioned in chamber 9 and has one of its ends seated in the groove 30 of valve member 25 and its opposite end seated on a flange 32 formed adjacent the point of communication between inlet 8 and chamber portion 9.

It will be observed, as clearly shown in FIGURE 2, that when valve member 20 is in the exhaust position illustrated therein, the surface 27 of valve member 25 engages the inner surface of chamber portion 10 between pressure outlet passages 11a, 12a and chamber 9. Pressure entering chamber 9 through inlet 8 flows about spring 31 and against member 25 to urge the lip portion 28 into even tighter engagement with a curved mouth or valve seat portion 10a of chamber portion 10, thus sealing inlet 8 from communication with outlet passages 11a, 12a. At the same time, passages 11a, 12a remain in communication with chamber portion 13 about reduced valve stem segment 24 and chamber 13 is in communication with atmosphere through fluted slots 14 about seal 22, the lands between the fluted slots 14 retaining the seal in groove 23.

While not shown in the drawings, it will be understood that movement of handle 4 about pivot 3, or counterclockwise as the parts are shown in the drawings, will cause the camming surface 4a to roll upon the plate surface 17a of plate 17 and will thus move valve member 20 against the action of spring 31 to move seal 22 beyond the fluted slots 14 and into sealing engagement with the inner surface of chamber 13 between fluted slots 14 and passages 11a, 12a and to move valve member 25 into chamber 9 to permit communication between inlet 8 and outlet passages 11a, 12a about member 25 within chamber 9.

Valve member 20 is an easily replaceable, one-piece valve cartridge. The member 20 has only two positions, in which pressure outlet passages 11a, 12a are in communication with either inlet 8 or exhaust outlet 14. The cam surface 4a insures maintenance of valve member 20 in emergency or exahust position, to which it is urged by the action of the single spring 31, when handle 4 is flipped into its exhaust position. Handle 4 may be easily and rapidly moved or flipped into such emergency position by a mere slapping or brushing action of the hand of the vehicle operator, the handle 4 being normally presented at and extending from or adjacent the dash of the vehicle cabin. In moving handle 4 between its two, charge and emergency, positions, the operator need only rotate curved camming surface 4b upon plate surface 17a. To move handle 4, and thus valve cartridge 20, from the emergency exhaust position shown to the charge position, and thus to free the brakes for vehicle movement, the operator must overcome the action of spring 31 as surface 4b is rotated upon surface 17a. Once surface 4b has been traversed and relatively flat surface 4c reaches plate surface 17a, the handle and valve are in charge, or pressure-transmitting position and the handle and valve will remain in said position. When the operator desires to exhaust the system and thus to apply the brakes, it is only necessary to move handle 4 sufficiently to disengage surface 4c from plate 17 and to begin engagement of surface 4b therewith, the movement of handle 4 thereafter being abetted by the action of spring 31. Thus the valve assembly of the invention is safety-oriented toward the brakes-on position while being positively positionable in and self-maintained at either brakes-on or brakes-off position.

The valve housing mounting frame 5 serves the additional functions of providing a guide structure for sliding plate 17 and an open-to-atmosphere escape area for exhausting fluid pressures. Similarly, portion 10 of the valve chamber serves as both a guide surface and cylindrical seat for valve member 25, the outlet passages 11a, 12a being positioned at the end of portion 10 and at one side of outlets 11, 12.

Though not shown in the drawings, it will be clearly understood by those skilled in the art that member 25 moves into chamber portion 9 when the handle 4 and valve 20 are moved into charge position. Surface 4c is spaced from pin 3 a distance such as to limit such movement of member 25 so as to permit passage of fluid pressure from inlet 8 through chamber 9 about member 25 and through chamber 10 to outlet passages 11a, 12a, the seal 22 sealing exhaust passages 13, 14 against escape of fluid pressure to atmosphere. In such position, surface 4c is between and normal to pin 3 and surface 17a of plate 17 and is effective to hold the valve in said charge position against the action of spring 31.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

What is claimed:

A valve assembly including a housing, a plurality of spaced legs on said housing, a chamber in said housing, said chamber being open to atmosphere between said legs, a cartridge slidably mounted in said chamber and having a portion extending in an area between said legs, a plurality of axially parallel slots formed in the inner wall of said chamber and communicating with atmosphere in the area of said legs, a seal carried by said cartridge and engaging the inner surface of said chamber between said slots when said cartridge is in one position, said seal engaging the inner surface of said chamber inwardly of said slots to seal said slots when said cartridge is in another position, a pressure outlet in said housing, said pressure outlet communicating with said exhaust slots about said cartridge when said cartridge is in said first-named position, a valve member carried by said cartridge, a pressure inlet in said housing, said valve member sealing said pressure inlet from said pressure outlet when said cartridge is in said first position, said valve member opening communication between said inlet and said pressure outlet when said cartridge is in said second position, a plate carried by said cartridge and slidably mounted on said legs, an operating handle pivoted eccentrically on said legs, said operating handle having a camming surface operatively engaging said plate, yielding means in said housing and engaging said cartridge to continuously urge said plate against said handle camming surface and to urge said cartridge toward said first position, said handle camming surface having a relatively flat portion engaging said plate when said handle is in one position, said handle camming surface having a second relatively flat portion engaging said plate when said handle is in its opposite position, said handle camming surface having a curved portion between said first and second relatively flat portions.

References Cited by the Examiner

UNITED STATES PATENTS

| | | | |
|---|---|---|---|
| 907,686 | 12/1908 | Duffie | 137—625.25 X |
| 2,997,063 | 8/1961 | Anderson et al. | 251—263 X |
| 3,168,353 | 2/1965 | Horowitz | 137—625.26 X |

FOREIGN PATENTS 416,021    11/1946    Italy.

MARTIN P. SCHWADRON, Acting Primary Examiner.